United States Patent

Bennett

[15] 3,636,772

[45] Jan. 25, 1972

[54] DEVICE FOR MEASURING THE FRIABILITY OF PARTICULATE SOLID MATERIALS

[72] Inventor: Harold L. Bennett, Sanford, Mich.

[73] Assignee: The Dow Chemical Company, Midland, Mich.

[22] Filed: Feb. 24, 1970

[21] Appl. No.: 13,715

[52] U.S. Cl. .................................................73/432 R, 73/7
[51] Int. Cl. ..........................................................G01n 19/00
[58] Field of Search....................73/432 R; 241/84, 94, 175; 209/321

[56] References Cited

UNITED STATES PATENTS 3,511,078  5/1970  Rajkai....................................73/432 R

FOREIGN PATENTS OR APPLICATIONS 1,283,676  12/1961  France...................................241/175

Primary Examiner—S. Clement Swisher
Attorney—Griswold & Burdick, Jerome L. Jeffers and William R. Norris

[57] ABSTRACT

A method and a device for measuring the friability of particulate solid materials. The device comprises a chamber, having an inlet for gas and an outlet for fractured particles of the solid material in operative connection with means for its vibration. The chamber has a screen horizontally mounted and means for measuring the amount of material which is fractured and passes through the screen when the container is vibrated. In operation, gas is injected through the inlet to force the fractured material through the outlet.

4 Claims, 1 Drawing Figure

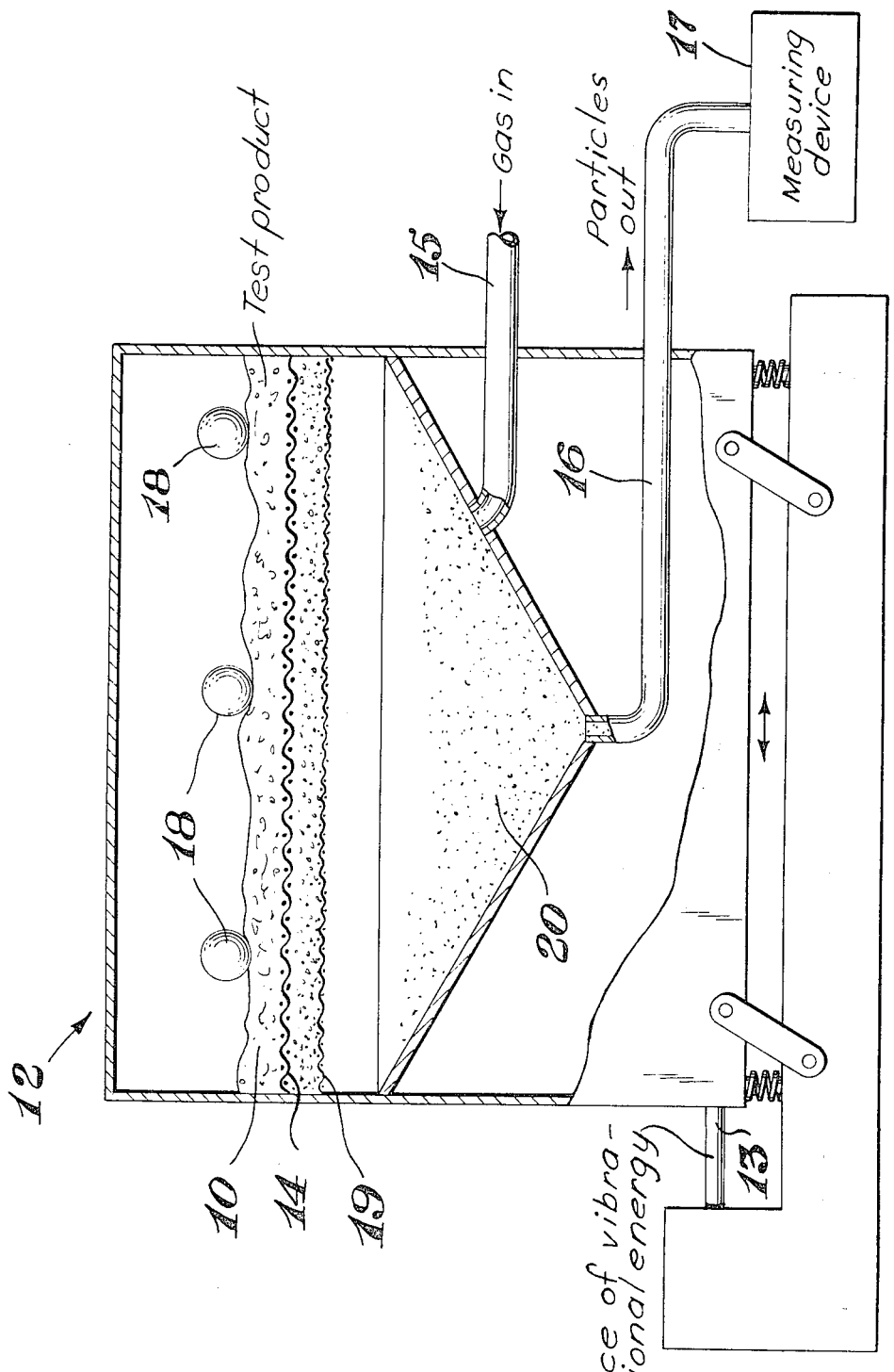

DEVICE FOR MEASURING THE FRIABILITY OF PARTICULATE SOLID MATERIALS

BACKGROUND OF THE INVENTION

Certain friable materials such as caustic soda, calcium chloride, sodium chloride and other semirigid solids are produced in the form of particulate granules or flakes. This facilitates their use as dry chemicals in formulations as well as for large scale operations such as melting ice on roadways.

A problem arises in the marketing of these products due to their propinquity to break up into small fragments producing a dusty material. Methods are available for producing less friable particles and thus avoiding the dusting problem. However, in order to insure adequate quality control, a convenient means of testing the friability of the particles is needed.

Methods are known for measuring the strength of solid materials such as coke. One such method is the ASTM Drop Shatter Test for Coke, Designation D141-48, wherein the coke is shattered and a relative strength index, usually reported as the weight percent of the original coke passing through or being caught in a sieve of some arbitrary size, is determined. Such a testing method is not readily adaptable for testing particles which shatter into dust due to the difficulty in collecting sufficient dust particles for quantitative measurement.

It would be desirable, and it is the object of the present invention to provide a novel device for measuring the friability of particulate solid material.

An additional object is to provide such a device which will quantitatively measure the friability of materials which break up into dustlike particles.

A further object is to provide a method for quantitatively measuring the friability of particulate solid materials which break up into dustlike particles.

SUMMARY OF THE INVENTION

The present invention provides a device and a method for measuring the friability of particulate solid material. The device comprises a screen positioned within a vibratable chamber. The chamber, which is substantially airtight to prevent the loss of dust particles, is provided with an inlet for gas and an outlet for particles of the solid material being tested. The screen has apertures smaller in size than the solid particles to be tested and is preferably mounted in the chamber in a substantially horizontal position. A tilt of less than about 10° is desirable with 0° tilt being optimal. The device is equipped with means for measuring the amount of particulate material which passes through the screen and out of the outlet upon vibrating the container and injecting gas through the inlet. Preferably, the lower part of the chamber is funnel shaped to expedite passage of the particles to the outlet.

DETAILED DESCRIPTION OF THE INVENTION

One embodiment of the invention is illustrated by the accompanying drawing. A chamber 12 for the test product 10 is connected to a source of vibrational energy 13 in a manner which permits the chamber to vibrate. A screen 14 having apertures smaller in size than the particles to be tested is horizontally mounted in the chamber. The chamber is provided with an inlet for gas 15 and an outlet for particles 16 located below the screen. In operation, the test product is placed on the screen and the chamber is vibrated. Those particles which break into pieces small enough to pass through the screen are blown by the gas stream out the outlet to a device 17 for measuring their amount.

Optionally, objects 18 which are harder and heavier than the test product are placed upon the screen with the test product. When the container is vibrated, fracturing of the test product is facilitated by action of the heavy objects. An optional second screen 19 having smaller openings than the first can be placed below it. The second screen will prevent any particles which are forced through the first by the weight of the heavy objects from passing through the outlet and being measured by the measuring means.

The testing device is especially effective for testing the friability of hygroscopic compositions such as NaOH or $CaCl_2$. By sealing the chamber to prevent the entrance of moisture from the atmosphere and injecting a substantially anhydrous gas through the inlet, the hygroscopic material can be prevented from gathering moisture during the testing. In this manner, the friability of the dry material can be determined. Particles in flake form are the preferred test product when high reproducibility is desired since a granular material may partially clog the screen.

The invention is further illustrated by the following example:

Example I

A device of the design set out in the drawing was set up and operated in the following manner:

Two hundred grams of caustic flake were placed on a U.S. No. 35 screen. Twenty alumina cylinders, ¾-inch diameter by 13/16 inches, were placed on the screen with the caustic. A U.S. No. 40 screen was placed beneath the No. 35 screen and both placed in a test chamber. The test chamber was sealed except for the presence of 2¾-inch copper tubes projecting through its side. One piece of tubing functioned as an inlet for nitrogen gas at a rate of 0.5–1.0 standard cubic feet per minute, while the other served as an outlet for fractured particles. Substantially anhydrous, i.e., less than 0.01 percent $H_2O$ by weight, nitrogen was employed. By keeping the test container essentially free of moisture, plugging of the screen and changes in the friability of the test sample due to moisture build up in the caustic were minimized.

The test chamber setup was mounted in a commercially available device for generating vibrational energy. As dust was generated by the vibrations, it was conveyed by the gas stream to a dust monitor consisting of a water stream in which the caustic dust dissolved to form an electrically conducting solution. The conductivity of this solution, which was proportional to the amount of caustic passing through the screen, was monitored continuously throughout the experiment.

After 1 minute of vibration, the caustic had a breakage rate of 0.15 g./min. As vibration continued, the weaker flakes were depleted and the breakage rate decreased. After 10 minutes, the rate had gone down to 0.1 g./min. A plot was made of conductivity-vs.-time and integrated to get a total breakage value (1.045 g.) for the sample. Dividing this number by duration of the experiment in minutes gave an average breakage rate of 0.116 g./min.

By reproducing the run with a standard caustic flake of suitable strength, the relative strength of the test sample is found by solving the equation:

$$Sr = \frac{R_1}{R_2}$$

where:

$S_r$ = relative strength
$R_1$ = rate for standard (10 min. value)
$R_2$ = rate for test sample (10 min. value)

A value for $S_r$ of 1 or greater indicates that the test sample is as strong as or stronger than the standard.

The conductivity test used for measuring the amount of fractured caustic in example 1 is only one of a variety of possible methods. For example, a device for measuring the weight of material passing through the screen could be used. A particle counter could be used when the size of particles passing through the sieve is large enough to make counting them practical.

We claim:

1. A method for testing the friability of particulate hygroscopic material which comprises:

a. placing the material upon a screen having apertures smaller than the particle size of the material while maintaining the screen in a substantially air tight chamber equipped with an inlet for gas and an outlet for particles;
b. vibrating the screen while injecting a substantially anhydrous gas through the inlet to move particles which pass through the screen out the outlet; and
c. measuring the amount of material which passes through the outlet in a given period of time.

2. The process of claim 1 wherein the gas is substantially anhydrous.

3. The process of claim 1 wherein the material is NaOH or $CaCl_2$.

4. The process of claim 1 wherein the chamber is hermetically sealed.

* * * * *